Figure 1:
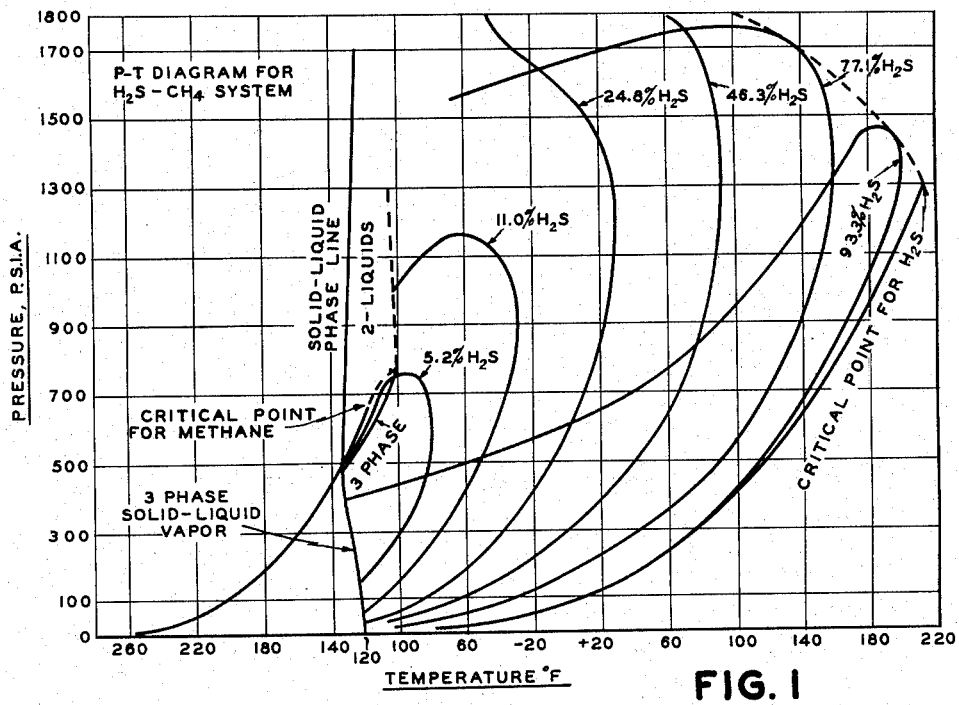

INVENTORS
JAMES PAUL KOHN
FRED KURATA
BY
ATTORNEY

Aug. 25, 1959  F. KURATA ET AL  2,901,326
SEPARATION OF HYDROGEN SULFIDE AND METHANE
Filed Dec. 22, 1955  3 Sheets—Sheet 3

INVENTORS
JAMES PAUL KOHN
FRED KURATA
BY

ATTORNEY

United States Patent Office

2,901,326
SEPARATION OF HYDROGEN SULFIDE AND METHANE

Fred Kurata, Lawrence, Kans., and James Paul Kohn, South Bend, Ind.

Application December 22, 1955, Serial No. 554,705

20 Claims. (Cl. 23—225)

This invention relates to the separation of hydrogen sulfide and gaseous hydrocarbons. In one aspect this invention relates to the purification of a methane stream containing hydrogen sulfide. In another aspect this invention relates to the recovery of sulfur from a normally gaseous hydrocarbon stream containing same. In still another aspect this invention relates to the separation of hydrogen sulfide from a high sulfur content natural gas.

Various normally gaseous hydrocarbon streams containing methane as the major component also contain sulfur-bearing compounds, such as hydrogen sulfide, in amounts which require the separation of such sulfur-bearing compounds from the gas stream.

Present methods for removal of hydrogen sulfide from hydrocarbon streams containing above 6 mole percent hydrogen sulfide are inadequate and impractical, yet there is a definite need to reduce the hydrogen sulfide content of such streams.

These sulfur-bearing compounds, such as hydrogen sulfide, normally must be removed because they are corrosive to equipment used for storage or treatment of the methane-containing gaseous stream. Also, such streams when used as domestic fuels have an undesirable odor which requires the removal of the hydrogen sulfide. In addition, various catalytic treatments of the methane-containing stream require the removal of hydrogen sulfide because the hydrogen sulfide deactivates and contaminates the catalyst employed.

It is apparent from the above that this invention has wide application to the purification of normally gaseous hydrocarbon streams containing hydrogen sulfide. The hydrogen sulfide may be present in the stream as supplied from the well or may be formed by various treatments prior to the desired separation of the hydrogen sulfide from the stream. Natural gas from certain localities, such as Canada and the Near East, often contains a high percentage, above 6 mole percent, of hydrogen sulfide. Natural gas is useful as fuel and as a source of hydrogen. Hydrogen produced by the reforming of methane may be used, for example, in ammonia synthesis, in the Fischer-Tropsch process, in hydroforming of naphtha, and other chemical processes. Aside from natural gas, methane-containing streams contaminated with hydrogen sulfide are obtained from refinery processes. These methane streams from refinery processes may be used as fuel or as a recycle gas to the process. In these processes, also, it is essential to remove hydrogen sulfide from the refinery gases.

In addition to the purification of methane-containing streams, the present invention has particular application to the recovery of sulfur as a product of the process, especially when the sulfur content of the methane-containing stream is high. Certain natural gas streams contain a sufficient amount of sulfur so that the recovery of the sulfur itself would be economically feasible as well as the purification of the methane.

Numerous processes have been developed for the removal of low percentages of hydrogen sulfide and other acidic components from a gaseous hydrocarbon stream such as natural gas, but, as previously stated, these processes are inadequate for removal of hydrogen sulfide when present in amounts above 6 mole percent. Among the most common of these methods is the absorption of hydrogen sulfide from the natural gas stream by such absorption media as monoethanolamine, diethanolamine, triethanolamine, diethanolamine-diethyleneglycol, and mixtures thereof. Aqueous solution of sodium carbonate, tripotassium phosphate, sodium and potassium alcoholates in admixture with a suitable solvent, such as nitromethane, polyalkenes, and polyamines are also useful for liquid phase absorption and removal of hydrogen sulfide. Treatment of the gaseous stream contaminated with hydrogen sulfide with solid contact materials to remove the hydrogen sulfide is also practiced to some extent. Such treatments include catalytic decomposition of the hydrogen sulfide, such as with iron oxide, to convert the sulfur to sulfur dioxide or other compounds which may be removed by distillation or absorption.

These above processes require relatively complicated equipment and the use of relatively expensive reactants or reagents, and in addition, they are impractical because the reagents, such as the amine solution, become quickly saturated placing an excessively heavy load on the regenerator. It is much to be desired, therefore, to provide a process and method for removal and recovery of acidic components, such as hydrogen sulfide, from methane-containing gases by a simpler, less expensive process and one that is useful to remove hydrogen sulfide from hydrocarbon streams containing more than 6 mole percent hydrogen sulfide.

The object of this invention is to provide a method for purification of normally gaseous hydrocarbon stream containing acidic components.

Another object of this invention is to provide a new and useful method for removal of hydrogen sulfide from natural gas containing high percentages of hydrogen sulfide.

Still another object of this invention is to provide a method for the recovery and purification of sulfur.

It is still another object of this invention to provide a more economical and inexpensive process which utilizes the high pressure available of natural gas from the well head.

Still another object of this invention is to provide a method for more completely and effectively removing hydrogen sulfide from methane-containing gases containing more than 6 mole percent hydrogen sulfide than is heretofore practical.

Still another object is to separate small amounts of hydrogen sulfide from methane.

Various other objects and advantages of the present invention will become apparent to those skilled in the art from the accompanying description and disclosure.

According to this invention, a gas stream containing methane and more than 6 mole percent hydrogen sulfide is treated to remove the hydrogen sulfide by subjecting this stream at a pressure of at least 450 pounds per square inch absolute and a sufficiently low temperature to form two liquid phases, a methane rich liquid phase and a hydrogen sulfide rich liquid phase. The methane rich liquid phase is recovered as a product of the process or may be treated further to remove the remaining hydrogen sulfide therefrom and then recovered as a product of the process. The hydrogen sulfide phase is disposed of as a contaminant or waste, or it is treated for the recovery of the sulfur as a product of the process.

At 485 pounds per square inch absolute, a temperature of −132° F. is required to form the two liquid phases. Under these conditions, in addition to the liquid phase, a vapor phase is also formed containing a minor proportion of hydrogen sulfide and rich in methane. Increasing the pressure at this temperature, or decreasing the temperature at this pressure, results in the disappearance of the vapor phase leaving only the two liquid phases present. By increasing the pressure and temperature along the pressure-temperature 3 phase curve of Figure 1 of the drawings up to a pressure of about 770 pounds per square inch absolute and a temperature of −99° F., two liquid phases and a vapor phase continue to exist. At any given temperature along this 3 phase curve of Figure 1, if only the pressure is further increased above that indicated by the curve, the vapor phase disappears leaving only the two liquid phases. Similarly, if the temperature is reduced below that for any given pressure on the pressure-temperature 3 phase curve of Figure 1, the vapor phase disappears.

Operations are generally carried out at a pressure of at least 450 pounds per square inch absolute and as high as about 800 pounds per square inch absolute or higher at a temperature between about −135° F. and about −95° F., either at vapor-liquid-liquid equilibrium, or at liquid-liquid conditions. Under three-phase equilibrium conditions, both the liquid methane rich phase and the vapor methane rich phase are recovered and/or further treated to recover a substantially pure methane stream. Under liquid-liquid conditions, a methane rich liquid phase and a hydrogen sulfide rich liquid phase are the only phases formed, and the methane rich phase is recovered.

The other curves of Figure 1 show generally the two phase liquid-vapor border curves for specific $H_2S$ content mixtures and the solid-liquid freezing point curve. These curves show what is observed outside the temperature and pressure ranges used for the separation process of this invention.

Under three-phase equilibrium conditions, the hydrogen sulfide content of the vapor phase will be between about 3.5 and about 6 mole percent hydrogen sulfide; the liquid methane rich phase will contain between about 6 and about 7.5 mole percent hydrogen sulfide; and the liquid hydrogen sulfide rich phase will contain about 90 mole percent hydrogen sulfide. At liquid-liquid conditions, the two liquid phases have about the same compositions as the liquid phases in three phase equilibrium but there is no vapor phase.

The following data of Table I indicate actual compositions for mixtures of methane and hydrogen sulfide at the stated pressures and temperatures:

TABLE I

| Pressure, p.s.i.a. | Temp. °F. | Mole percent $H_2S$ in vapor | Mole percent $H_2S$ in $CH_4$ layer | Mole percent $H_2S$ in $H_2S$ layer |
|---|---|---|---|---|
| 15 | −258 | 0.1 | 0.1 | Solid |
| 300 | −160 | 1.5 | 3.1 | Solid |
| 485 | −132 | 3.7 | 6.6 | 89.6 |
| 514 | −125 | 3.7 | 6.6 | 89.6 |
| 740 | −102 | 5.8 | 7.2 | 89.5 |
| 770 | −99 | 6.9 | 6.9 | 89.5 |

Figure 2:
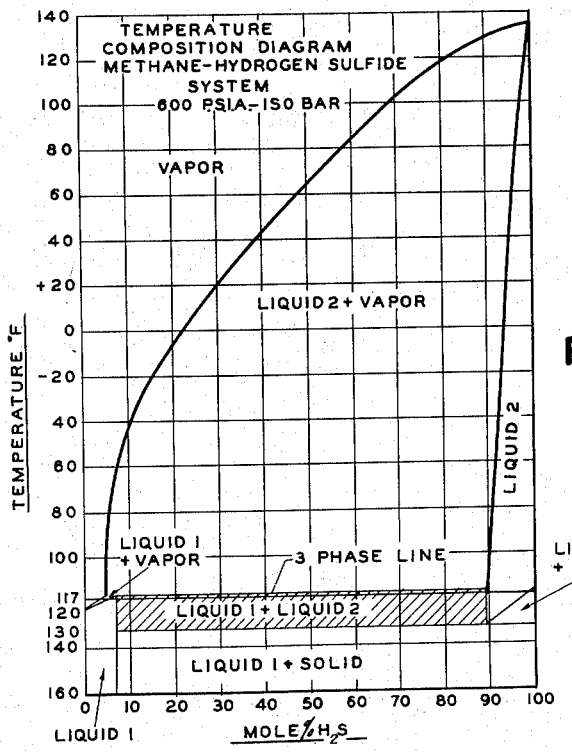

Figure 2 of the drawings is a temperature-composition diagram at the 600 pound per square inch absolute isobar which most effectively illustrates the phase changes and compositions for the hydrogen sulfide-methane system as discussed above. Figure 2 is in effect a working example based on actual experimental data taken at 600 pounds per square inch absolute. The respective areas in the diagram of Figure 2 of the drawings indicate the various phases in equilibrium with each other. On the 3 phase line at −117° F. is shown a vapor containing 4.6 mole percent hydrogen sulfide in equilibrium with liquid 1 containing 7 mole percent hydrogen sulfide and with liquid 2 containing 89.7 mole percent hydrogen sulfide. As is illustrated in the diagram of Figure 2, a solid begins to form at about −130° F. (±2) under this pressure. At 600 pounds per square inch absolute and −117° F. using a methane stream containing more than 7 mole percent hydrogen sulfide, the vapor phase containing 4.6 mole percent hydrogen sulfide and the liquid phase containing 7 mole percent hydrogen sulfide are recovered as products of the process. The liquid phase containing 7 mole percent hydrogen sulfide forms a liquid layer above a liquid layer containing 89.7 mole percent hydrogen sulfide and thus can be easily separated therefrom by decantation. As is evident from the diagram, if the temperature is decreased below −117° F., or the pressure is increased above 600 pounds per square inch absolute, only the above two liquid phases exist. In such instance, the upper liquid phase containing 7 mole percent hydrogen sulfide is decanted and recovered.

It should be mentioned that the critical solution temperature of the $H_2S$—$CH_4$ system is −99.0° F. under a pressure of 770 pounds per square inch absolute. The two liquid phases will not form above this temperature. Also, the hydrogen sulfide layer begins to freeze at −132° F. under a pressure of 485 pounds per square inch absolute or lower. Therefore, for the system of $H_2S$—$CH_4$, the range of pressures and temperatures employed which will allow the formation of two liquid phases is from −132° F. and 485 pounds per square inch absolute to −99° F. and 770 pounds per square inch absolute.

Since natural gas contains certain impurities, such as ethane, carbon dioxide, and nitrogen, the presence of these impurities will alter the above limits of temperature and pressure to some extent allowing a range for operation of the separation equipment of from about −135° F. to about −95° F. at the equilibrium pressure or higher. In such a system the pressure is always maintained above 450 pounds per square inch absolute, and the temperature is lowered to a point where at least two liquid phases are formed. If the temperature is held at equilibrium, three phases will be formed. If the temperature is lowered below the equilibrium temperature, which is in effect increasing the pressure for the equilibrium temperature, only two phases will be formed, both being liquid. Of course, the critical temperatures and pressures must be observed for the particular composition. In effect, then the presence of other materials then the methane and hydrogen sulfide will alter these critical temperatures slightly, and each particular system must be observed for the critical temperatures if the separation is to be carried out at or near the extreme limits permitted by critical temperatures and pressures. For three phase conditions operations are always below the critical temperature and pressure of the mixture when working at the conditions specified above.

Figure 3:
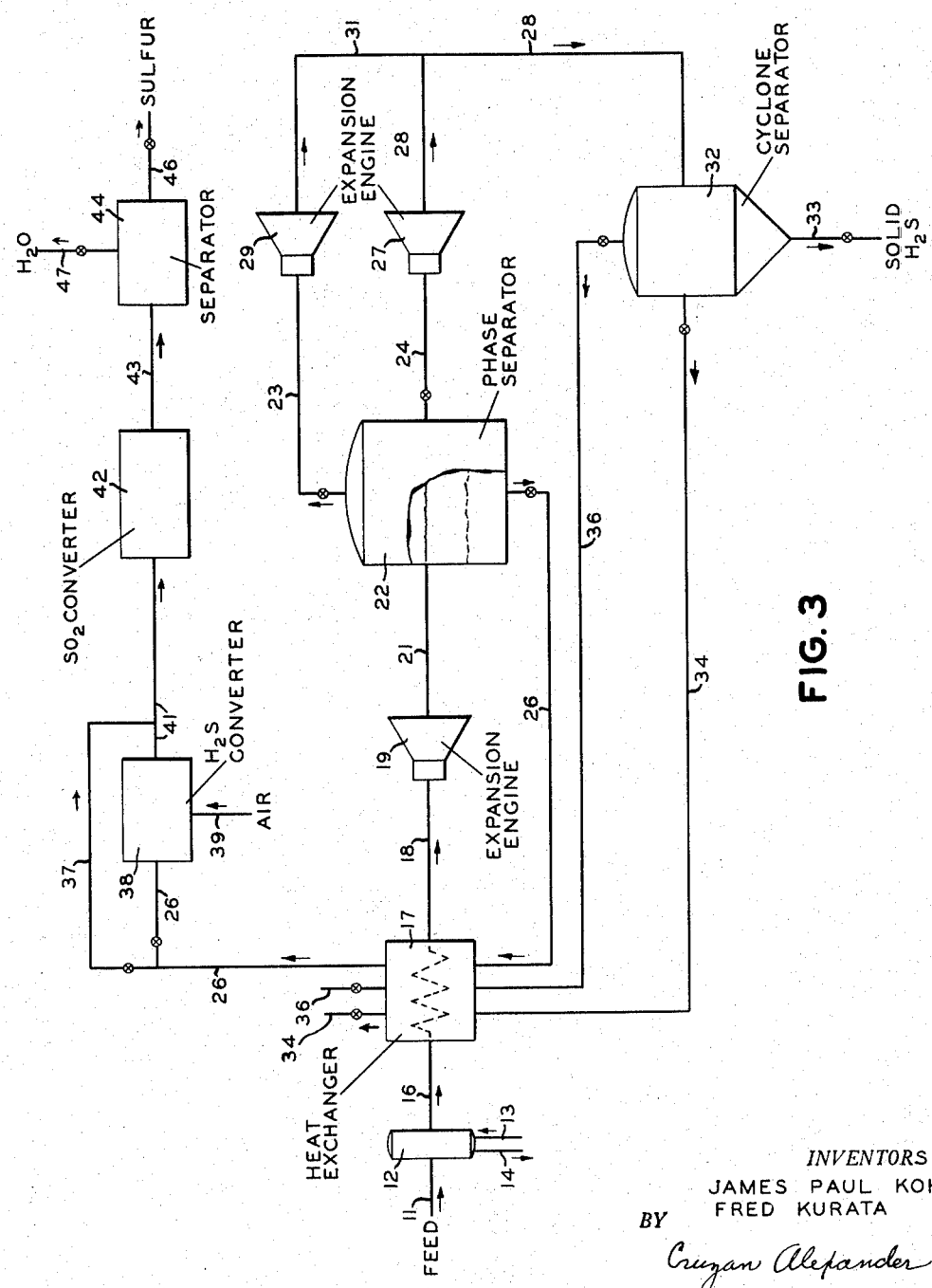

Figure 3 of the drawings illustrates an arrangement of apparatus of the present invention using as a working example operating conditions for the continuous removal of hydrogen sulfide from natural gas in which the separation is effected in accordance with the conditions shown in Figure 2 of the drawings. According to Figure 3 of the drawings, natural gas, which has been dehydrated by conventional means, at a pressure of about 3000 pounds per square inch absolute and a temperature of 100° F. or higher is passed from the well or a compressor through a conduit 11 to a conventional water cooler 12. A typical composition of a dehydrated high sulfur natural gas is shown below.

| Component: | Mole percent |
|---|---|
| Nitrogen | 4.42 |
| Methane | 85.45 |
| Ethane | 2.65 |
| $H_2S$ | 7.00 |
| Propane | 0.48 |
| Total | 100.00 |

In cooler 12 the natural gas is indirectly contacted with water passing into cooler or heat exchanger 12 through conduit 13 and removed therefrom through conduit 14. The natural gas is cooled from a temperature of about 100° F. to a temperature of about 90° F. The cooled natural gas stream at 3000 pounds per square inch absolute is then passed from cooler 12 through a conduit 16 to a conventional heat exchanger 17 where it is further cooled from a temperature of 90° F. to a temperature of about —100° F. by indirect heat exchange with the various cold product streams of the separation process. The cooled gas stream from exchanger 17 is then passed through a conduit 18 to a conventional expansion valve or expansion engine 19. In expansion valve 19 the methane stream is expanded by reduction of pressure from 3000 pounds per square inch absolute to 600 pounds per square inch absolute. This expansion cools and partially condenses the natural gas stream to a temperature of about —117° F.

Heat exchanger 17 may or may not liquefy a portion of the gas stream. If the gas pressure is above the critical pressure of the mixture, there will be no phase change. In the instant case where the pressure is 3000 pounds per square inch absolute, no condensation will take place. However, after the gas passes through valve or expansion engine 19, we will have liquefaction so that there will be two liquid phases and a vapor phase. The pressure must be raised in the separator or its temperature lowered if it is desired to maintain only two liquid phases in the separator. In any event, three phases should issue from the expansion valve or engine 19. External refrigeration can be used in addition to the expansion valve 19 in order to get the desired conditions of pressure and temperature in the separator 22.

This stream is then passed through conduit 21 to a phase separator or accumulator 22 in which, in this embodiment described here, three phases are formed; a vapor phase containing about 4.6 mole percent hydrogen sulfide and two liquid phases. The upper methane-rich liquid phase contains about 6 to 7 mole percent hydrogen sulfide and the lower liquid phase contains about 90 mole percent hydrogen sulfide. The conditions of temperature and pressure in phase separator 22 are a pressure of about 600 pounds per square inch absolute and a temperature of —117° F. The conditions and compositions of the phases in separator 22 are essentially the same as those shown in the diagram of Figure 2 of the drawings. Changing of either temperature or pressure would result in the phase changes shown in the diagram of Figure 2 as discussed more fully hereinafter. The vapor phase and the upper liquid phase rich in methane are removed from phase separator 22 through conduits 23 and 24, respectively, and may be heat exchanged with the incoming natural gas stream in heat exchanger 17, if desired, or may be recombined or separately treated to remove the desired amount of hydrogen sulfide still remaining in these phases without departing from the scope of this invention. A pressure drop of about 20 pounds per square inch occurs for all of the product streams passing through heat exchanger or cooler 17. The hydrogen sulfide layer in separator 22 is removed through conduit 26 and also may be heat exchanged with the natural gas stream in heat exchanger 17. This stream is then passed to a flare or a sulfur recovery unit as shown.

If there are three phases in equilibrium in a binary mixture in separator 22, the phase rule specifies that there is one degree of freedom. Therefore, if the temperature of separator 22 is fixed, the pressure is automatically fixed. However, if the pressure is raised above 600 pounds per square inch absolute at —117° F. in separator 22, only two liquid phases and no vapor phase will exist. Here, separator 22 will separate upper and lower liquid layers. Also, if there are only two phases present, the phase rule specifies two degrees of freedom. Therefore, both pressure and temperature can be varied within limits so long as the temperature is maintained between —99.0° F. and —132° F. (—99.0° F. is the critical solution temperature for $H_2S$—$CH_4$ system, i.e., two liquid phases will not exist above this temperature. Also, —132° F. is the freezing point, under 485 pounds per square inch absolute). If the separator 22 is operated at 600 pounds per square inch absolute, —117° F. is the temperature in the separator if three phases exist. However, if the temperature is lowered below —117° F. at 600 pounds per square inch absolute, only two phases can exist in separator 22. In this case the temperature can be lowered to about —130° F. before the bottom layer starts to freeze. So at 600 pounds per square inch absolute separator pressure, the temperature can be varied between —130° F. and —117° F. and only two liquid phases and no vapor phase will exist in the separator.

In the preferred embodiment of the present invention, the vapor phase and the upper liquid phase of separator 22 are treated to remove the remaining hydrogen sulfide therefrom by a new low temperature method of operation. According to this new method for the removal of the remaining hydrogen sulfide, the upper liquid phase in separator 22 is passed through conduit 24 and through an expansion valve 27 where liquid is vaporized and expanded from 600 pounds per square inch absolute to 14.7 pounds per square inch absolute while the temperature is lowered to —285° F. At this temperature solid hydrogen sulfide is formed.

Simultaneously the vapor phase of separator 22 is passed through conduit 23 and an expansion valve 29 where it is also expanded from 600 pounds per square inch absolute to 14.7 pounds per square inch absolute and lowered to a temperature of —258° F. at which temperature solid hydrogen sulfide is formed. The expanded streams from the respective expansion valves 27 and 29 are passed through conduits 28 and 31 to a cyclone separator 32. In cyclone separator 32, solid hydrogen sulfide is separated from vaporous methane and any unvaporized methane. Solid hydrogen sulfide is removed therefrom through conduit 33. The purified vapor which contains less than 0.1 mole percent hydrogen sulfide is removed from separator 32 by means of conduit 36 and heat exchanged in heat exchanger 17 with the incoming methane feed. Similarly, any liquid which settles to the bottom of separator 32 is removed therefrom through conduit 34 and passed in heat exchange with methane feed in heat exchanger 17. This liquid in conduit 34 also contains less than 0.1 mole percent hydrogen sulfide. The vapor stream in conduit 36 and the liquid stream in conduit 34 may be either combined or recovered separately as products of the process, or further treated to remove the last traces of hydrogen sulfide as hereinafter described.

The above purification of the methane-rich phase of separator 22 is based on the solubility of solid hydrogen sulfide in methane at —258° F., the normal boiling point of methane at atmospheric pressure. At these conditions hydrogen sulfide in both the liquid and vapor methane rich phases is less than 0.1 mole percent. This procedure enables the substantially complete removal of hydrogen sulfide as a solid from methane.

As an alternative method for operating the above described process with respect to removing the last traces of hydrogen sulfide, separator 22 is operated at a pressure of 600 pounds per square inch gage and a temperature of —120° F. so that there are only the two liquid phases present. In this manner of operation no vapor phase is formed. The upper methane rich layer containing about 6 mole percent hydrogen sulfide is expanded through an expansion valve, such as valve 27, and is passed as previously described with regard to the three-phase type of operation. As an alternative to the cyclone separator 22, a centrifugal separator may be used. The solid crystals of hydrogen sulfide are removed from cyclone separator or centrifugal separator 32 as a slurry through conduit 33. If desired, two separators may be used in place of the single separator 32. In the operation of two separators, hydrogen sulfide crystals are removed from one separator when it is off stream, while the other separator is on stream collecting crystals.

As an alternative to the removal of the last traces of hydrogen sulfide from the methane rich phases in separator 22 by crystallization, one may use conventional methods such as scrubbing these methane rich streams in conduits 23 and 24 with an amine. Alternatively, these streams may be fractionated at low temperature to remove a vapor phase substantially free from hydrogen sulfide. If desired, this vapor phase may then be treated with an amine solution.

Figure 4:
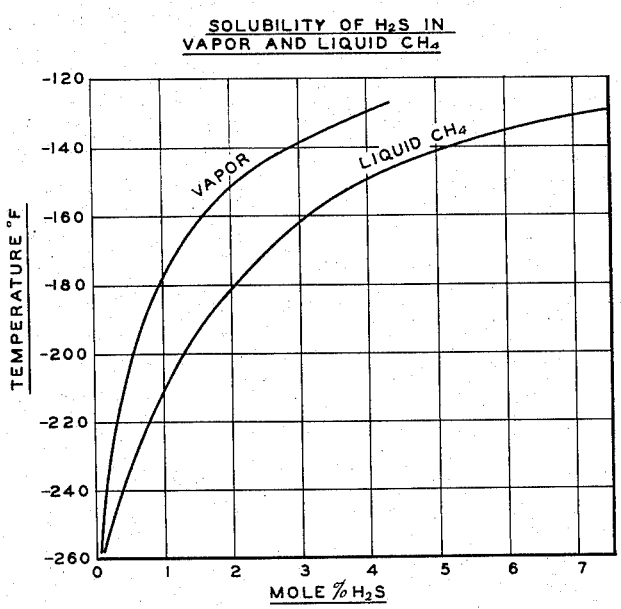

As a modification of the present invention in which the original feed gas contains 6 mole percent or less, hydrogen sulfide is removed from the methane stream as a solid. In this modification the natural gas which is available at about 3000 pounds per square inch is cooled to a temperature above the freezing point of hydrogen sulfide, for example to about −125° F. At this temperature and pressure, a single liquid phase is formed. The liquid phase is then expanded through an expansion valve to reduce the temperature below −132° F., as shown in Figure 4 of the drawing. Since the freezing point of the hydrogen sulfide-methane mixture is about −132° F. at 485 pounds per square inch absolute, the temperature in the first cooling step must be maintained above this solidification temperature. However, during the last expansion of the liquid phase, the cold stream is moving so fast and with such turbulence through the expansion valve that hydrogen sulfide will freeze out as fine crystals and will not interfere with the operation of the valve or clog the conduits. In order to remove the maximum amount of hydrogen sulfide from the methane stream, the stream is expanded to atmospheric pressure and a temperature of −258° F. The fine $H_2S$ crystals are separated from liquid and vaporous methane by a cyclone or centrifugal separator. Of course, if the natural gas stream contains more than 6 mole percent hydrogen sulfide, the embodiment of Figure 3 is used, in which the excess hydrogen sulfide above 6 mole percent is separated by decantation in separator 22. However, if the natural gas stream contains no more than about 7 mole percent hydrogen sulfide, the above freezing technique may be used directly without previous decantation.

The sulfur in the hydrogen sulfide layer in separator 22 is recovered in accordance with this invention by withdrawal of this layer from separator 22 through a conduit 26 and passing it to heat exchanger 17. From heat exchanger 17 the hydrogen sulfide stream is then passed through conduit 26 to an oxidation zone 38 in which hydrogen sulfide is reacted with air or oxygen introduced through a conduit 39 at a temperature between about 2000 and about 2500° F. This stream which passes through conduit 26 to oxidation zone 38 is about one third of the hydrogen sulfide stream. Another two thirds of the hydrogen sulfide stream is by-passed around oxidation zone 38 through a conduit 37.

In oxidation zone 38 hydrogen sulfide is converted to sulfur dioxide and water. This stream is then passed with or without removal of water therefrom through conduit 41 to conversion zone 42. The by-passed two-thirds stream of hydrogen sulfide in conduit 37 is introduced into a conversion zone 42 either in admixture with the sulfur dioxide stream or separately therefrom. In conversion zone 42, the remaining hydrogen sulfide is reacted with the sulfur dioxide in the presence of a catalyst comprising alumina, such as bauxite, at a temperature between about 500 and about 700° F. The gas passing from oxidation zone 38 is cooled by the cooled by-passed gases prior to contact of the catalyst in conversion zone 42. If insufficient cooling is achieved, a heat exchanger or cooler (not shown) is used. Conversion zone 42 may comprise one or more catalyst beds. In conversion zone 42 hydrogen sulfide reacts with sulfur dioxide to produce sulfur and water. The effluent containing vaporized sulfur is passed from conversion zone 42 through a conduit 43 to a sulfur-washed tower 44 where the sulfur is condensed and washed from the gas by counter-contact with a reflux of molten sulfur. Water vapor is removed from sulfur-washed tower 44 through a conduit 47 and molten sulfur is removed from washed tower 44 through a conduit 46 as a product of the process.

Figure 4 is a diagram showing the solubility of solid hydrogen sulfide in liquid methane and vaporous methane using sufficient pressure to maintain a liquid phase at the temperature employed. From this graph the conditions necessary for the purification of the methane rich streams removed from separator 22 are shown.

In Figure 3 of the drawings, if the feed gas or natural gas available from the well at a pressure of 1400 pounds per square inch, some modifications of the pressure and temperature conditions will exist in the passage of the gases from conduit 11 to expansion valve 19. In this example the natural gas will pass at a temperature of 100° F. and 1400 pounds per square inch absolute through cooler 12, and the temperature will be reduced to 90° F. and the gas will remain at approximately 1400 pounds per square inch. From cooler 12 these gases then pass through conduit 16 and heat exchanger 17 to conduit 18. The gases are cooled in heat exchanger 17 to a temperature of about −70° F. The gases pass through conduit 18 through expansion valve 19 and conduit 21 to separator 22. In expansion valve 19 the gases are cooled from −70° F. to −117° F., and the pressure is reduced from 1400 pounds per square inch absolute to 600 pounds per square inch absolute. The remainder of the process is substantially the same as previously described.

The following description of obtaining the data is offered as a better understanding of the invention and is not to be understood as unnecessarily limiting thereto.

*Example*

Figure 5:
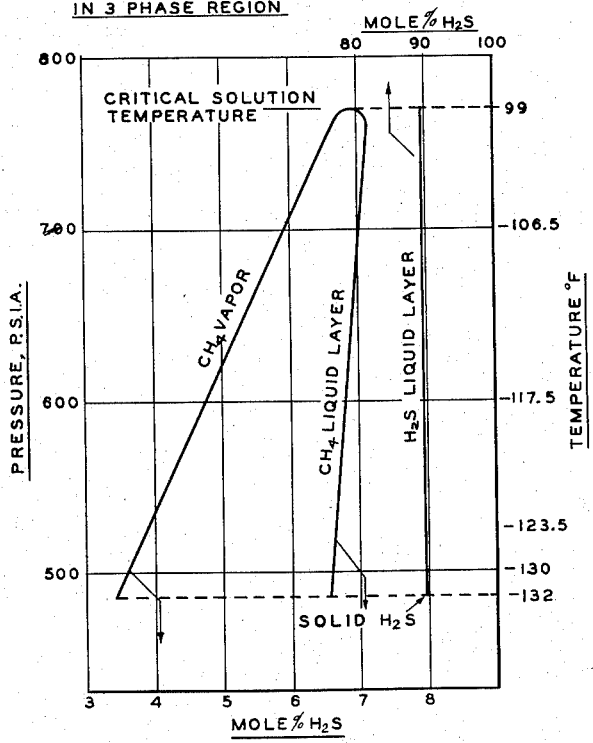

The experimental data used in making the composition diagram of Figure 5 and also Table I and Figures 1, 2 and 4 were obtained by charging to a high pressure reservoir substantially pure components of methane and hydrogen sulfide. The gas reservoir was first evacuated and then flushed with either methane or hydrogen sulfide. The gases were added to the reservoir in the desired proportions based upon approximate calculations using the perfect gas law and such compressibility factors as were available. The high pressure reservoir was heated with heat lamps and circulating air to raise the temperature of the system so that no liquid phase existed in the reservoir. The gases were mixed by molecular diffusion and by convection currents within the reservoir as it was heated. Calculations indicated that uniform mixtures were obtained in the reservoir in less than eight hours; therefore, all samples were allowed to stand for at least eight hours. Samples of the gas were taken from the reservoir and analyzed to determine the exact composition. The binary mixtures were determined by density measurements.

At temperatures above room temperature the volumetric behavior of the gas was measured by metering increments of gas into an evacuated low pressure reservoir. Precise knowledge of the reservoir volume, temperature, and pressure provided accurate volumetric data. A glass equilibrium cell and a low temperature bath were used for volumetric measurements below room temperature. Phase separations were noted by visual observations. The volumetric data was obtained by injecting known increments of gas from the high pressure reservoir into the glass equilibrium cell at constant temperature and observing the pressure rise. At temperatures below the condensation temperatures of the gas, the liquid density was determined by metering sufficient gas into the equilibrium cell so that it is filled with liquid.

For the binary systems, the vapor liquid equilibria was obtained by bubble point and dew point determinations of several mixtures at various temperatures.

The solid-liquid-vapor equilibrium was determined while starting at some low temperature and injecting gas into the equilibrium cell, slowly building up the pressure to the snow point. This is the pressure at which the first crystals or solids formed from the vapor at the existing bath temperature. The bath temperature was then raised a few degrees, and a new snow point obtained by the injection of more gas into the cell. This procedure was repeated until the formation of dew in the cell showed that the vapor-liquid region had been reached. At this temperature sufficient gas was added to the cell to form a measurable and visible liquid layer. The cell was then slowly cooled until solid crystals were formed and there were three phases coexisting in equilibrium. The three-phase line was defined by alternately raising the cell pressure by gas injection and lowering the temperature, thus obtaining several additional points at which the three phases are at equilibrium. By this method a pressure was reached at which the equilibrium cell was full of liquid. At this pressure there was a temperature at which a minute amount of solid existed at equilibrium with the liquid. This point was usually referred to as the crystal point.

Liquid-liquid-vapor equilibria were measured in the same manner as for solid-liquid-vapor equilibria except that the temperatures are generally higher in the former case.

The equilibrium cell was custom blown from high pressure Pyrex gage glass. The glass cell was annealed before use to remove residual strains. The cell was shielded to protect the observer from flying glass in case the glass ruptured. The cell was graduated for volume with ceramic ink which was fired on the cell. The cell was joined to stainless steel tubing with a neoprene O-ring, retained in a recess stainless steel stud, against the ground glass top of the cell. The tubing was then attached to the reservoir.

Pressure measurements above atmospheric pressure were made with a 16 inch Heise Bourdon tube gage. Temperatures in the low temperature ranges were determined with Aminco platinum resistance thermometers and a Mueller bridge. The Aminco thermometer was calibrated against a Leeds and Northrup resistance thermometer calibrated by the U.S. Bureau of Standards.

The reservoirs were made of stainless steel cylinders and were 96 cubic inches internal volume. One of the reservoirs was accurately calibrated volumetrically. The manifold and piping were constructed of standard ¼ inch high pressure stainless steel fittings, valves, and tubing. All lines outside the housing of the reservoir were ⅛ inch small bore steel tubing wrapped with Nichrome wire and insulated with fiberglass so that the tubing could be heated.

The temperature bath used to regulate the temperatures of the equilibrium cells consisted of a glass Dewar flask which was filled with a suitable liquid. Constant temperature is maintained in the bath by vaporizing liquid nitrogen and counter-balancing this cooling by controlled electrical heating. The choice of the bath liquid depends on the temperature desired. Kerosene, white gasoline, pentane, and propane were all used, depending upon the temperature desired.

Figure 5 of the drawings is based on actual experimental data and shows the composition in the methane vapor phase, the methane liquid phase and the hydrogen sulfide liquid phase in equilibrium between the point at which hydrogen sulfide begins to crystallize and the critical solution temperature. The composition of hydrogen sulfide in the $CH_4$ vapor and $CH_4$ liquid is shown on the bottom scale while the composition of the $H_2S$ layer is shown on the top scale. The composition of the hydrogen sulfide liquid layer appears to be substantially independent of temperature and pressure. At the critical solution temperature at the top of Figure 5, the vapor phase becomes identical with the $CH_4$ liquid layer. It will be noted that the vapor varies the most in composition on changes of temperature and pressure. From Figure 5, the preferred operating conditions of temperature and pressure may be readily chosen depending upon the particular requirements of the separation plant and the tolerable hydrogen sulfide content of the vapor phase. Also those conditions chosen will depend upon what further treatment, if any, is to be given the various phases recovered.

Various alternations and modifications of this invention may become apparent to those skilled in the art without departing from the scope of this invention. The graphs and curves of the figures are as accurate as experimental data and reproduction will permit, but it will be recognized that minor variations may occur in actual values without affecting the teachings of this invention.

Having described our invention, we claim:

1. A process for the recovery of sulfur and a normally gaseous hydrocarbon from a mixture containing same which comprises cooling a mixture containing methane and hydrogen sulfide in an amount above 6 mole percent while under a pressure above 450 pounds per square inch absolute to a temperature sufficiently low to form two liquid phases and a vapor phase, said vapor phase being rich in methane and containing not more than 6 mole percent hydrogen sulfide, one of said liquid phases being rich in methane and containing a minor amount of hydrogen sulfide and the other of said liquid phases being rich in hydrogen sulfide, expanding said vapor phase and said methane rich liquid phase to reduce the temperature to not higher than −258° F. such that solid hydrogen sulfide is formed, passing said cooled phases containing solid hydrogen sulfide to a separation zone to remove solid hydrogen sulfide from methane, recovering the methane from said separation zone containing less than 0.1 mole percent hydrogen sulfide, recovering said liquid hydrogen sulfide rich phase, treating said liquid hydrogen sulfide phase to produce free sulfur from the hydrogen sulfide, and recovering the free sulfur thus produced.

2. The process of claim 1 in which the methane stream from which solid hydrogen sulfide has been removed is heat exchanged with the incoming hydrogen sulfide-methane feed mixture to said process.

3. A process for the recovery of surfur and normally gaseous hydrocarbons from a mixture containing same which comprises expanding a mixture containing methane and hydrogen sulfide in an amount above 6 mole percent from a pressure substantially above 800 pounds per square inch absolute to a pressure between about 450 and about 800 pounds per square inch absolute to reduce the temperature to between −132 and −99° F. to form two liquid phases and a vapor phase, said vapor phase being rich in methane and containing between about 3.5 and about 6 mole percent hydrogen sulfide, the upper of said liquid phases being rich in methane and containing between about 6 and about 7.5 mole percent hydrogen sulfide and the lower of said liquid phases containing about 90 mole percent hydrogen sulfide, expanding said vapor phase and said methane rich liquid phase to reduce the temperature to below −258° F. and the pressure to about atmospheric such that liquid methane is vaporized and finely divided solid hydrogen sulfide is formed, passing said expanded and vaporized phases containing finely divided solid hydrogen sulfide through a cyclone separation zone to remove solid hydrogen sulfide from vaporous methane, recovering from said cyclone separation zone methane containing less than 0.1 mole percent hydrogen sulfide, further treating said methane from which solid hydrogen sulfide has been removed to remove the last traces of hydrogen sulfide, recovering a methane stream from said last treating step substantially free from hydrogen sulfide, recovering said liquid hydrogen sulfide rich phase and oxidizing about one third of same with an oxygen-containing gas at a temperature between about 2000 and about 2500° F. to convert hydrogen sulfide to sulfur dioxide, admixing the remainder of the hydrogen sulfide rich phase with the sulfur dioxide thus formed and passing same in contact with an alumina catalyst at a temperature between about 500 and 700° F. to produce free sulfur and water, and separating the free sulfur from the water.

4. A process for the recovery of sulfur and normally gaseous hydrocarbons from a mixture containing same which comprises cooling a mixture containing methane and hydrogen sulfide in an amount above 6 mole percent while under a pressure of between about 450 and about 800 pounds per square inch absolute to a temperature between −132 and −99° F. to form two liquid phases and a vapor phase, said vapor phase being rich in methane and containing between about 3.5 and about 6 mole percent hydrogen sulfide, one of said liquid phases being rich in methane and containing between about 6 and about 7.5 mole percent hydrogen sulfide and the other of said liquid phases containing about 90 mole percent hydrogen sulfide, expanding said vapor phase and said methane rich liquid phase to reduce the temperature to below −258° F. such that solid hydrogen sulfide is formed, separating a methane stream from said solid hydrogen sulfide containing less than 0.1 mole percent hydrogen sulfide, recovering said hydrogen sulfide rich phase and oxidizing a portion of the same with an oxygen-containing gas at a temperature between about 2000 and about 2500° F. to convert hydrogen sulfide to sulfur dioxide, admixing the remainder of the hydrogen sulfide rich phase with the sulfur dioxide thus formed and passing same in contact with an alumina catalyst at a temperature between about 500 and 700° F. to produce free sulfur and water, and separating the free sulfur from the water.

5. A process for the separation of hydrogen sulfide and a normally gaseous hydrocarbon from a mixture containing same which comprises cooling a mixture containing methane and hydrogen sulfide in an amount above 6 mole percent while under a pressure of at least about 450 pounds per square inch absolute to a temperature between −135 and −95° F. to form two liquid phases, one of said liquid phases being rich in methane and containing between about 6 and about 7.5 mole percent hydrogen sulfide and the other of said liquid phases containing about 90 mole percent hydrogen sulfide, expanding said methane rich liquid phase to reduce the temperature sufficiently low such that vaporous methane and solid hydrogen sulfide are formed, separating solid hydrogen sulfide from methane, and recovering a methane stream having less hydrogen sulfide than the feed stream as a product of the process.

6. A process for the separation of hydrogen sulfide and methane which comprises expanding a stream of methane containing above 6 mole percent hydrogen sulfide at a pressure above 800 pounds per square inch absolute to a pressure of about 450 to about 800 pounds per square inch absolute to reduce the temperature to between −132 and −99° F. to form a vapor phase and two liquid phases, said vapor phase being rich in methane and containing between about 3.5 and about 6 mole percent hydrogen sulfide, one of said liquid phases being rich in methane and containing between about 6 and about 7.5 mole percent hydrogen sulfide and the other of said liquid phases containing about 90 mole percent hydrogen sulfide, passing said phases into a separation zone to form an upper vapor phase and two liquid phases of the above compositions, the upper of said liquid phases being said methane rich liquid phase, and withdrawing said methane rich phases from the separation zone as a product of the process.

7. A process for the separation of hydrogen sulfide and methane which comprises cooling a stream of methane containing above 6 mole percent hydrogen sulfide at a pressure of about 450 to about 800 pounds per square inch absolute to a temperature between −135 and −95° F. to form a vapor phase and two liquid phases, said vapor phase being rich in methane and containing not more than 6 mole percent hydrogen sulfide, one of said liquid phases being rich in methane and containing a minor amount of hydrogen sulfide and the other of said liquid phases being rich in hydrogen sulfide, passing said phases into a separation zone to form an upper vapor phase of the above composition and two liquid phases, the upper of said liquid phases being said methane rich liquid phase, and withdrawing said methane rich phases from the separation zone as a product of the process.

8. A process for the separation of hydrogen sulfide and methane which comprises expanding a stream of methane containing above 6 mole percent hydrogen sulfide at a pressure substantially above 800 pounds per square inch absolute to a pressure of between about 450 and about 800 pounds per square inch absolute and reducing the temperature to between −132 and −99° F. to form two liquid phases, one of said liquid phases being rich in methane and containing between about 6 and about 7.5 mole percent hydrogen sulfide and the other of said liquid phases containing about 90 mole percent hydrogen sulfide, passing said phases into a separation zone to form an upper liquid phase and a lower liquid phase of the above compositions, the upper of said liquid phases being said methane rich liquid phase, and withdrawing said methane rich phases from the separation zone as a product of the process.

9. A process for the separation of hydrogen sulfide and methane which comprises cooling a stream of methane containing above 6 mole percent hydrogen sulfide while at a pressure of at least 450 pounds per square inch absolute to a temperature between about −135 and about −95° F. to form two liquid phases, one of said liquid phases being rich in methane and containing a minor amount of hydrogen sulfide and the other of said liquid phases being rich in hydrogen sulfide, passing said phases into a separation zone to form upper and lower liquid phases of the above compositions, the upper of said liquid phases being said methane rich liquid phase, and withdrawing said methane rich phase from the separation zone as a product of the process.

10. A process for the separation of hydrogen sulfide and methane which comprises cooling a stream of methane containing a relatively high amount of hydrogen sulfide while at a pressure of at least 450 pounds per square inch absolute to a temperature sufficiently low at the pressure employed to produce only two liquid phases, one of said liquid phases being rich in methane and containing between about 6 and 7.5 mole percent hydrogen sulfide and an amount less than in the feed stream, and the other of said liquid phases containing about 90 mole percent hydrogen sulfide, and recovering the methane rich liquid phase.

11. A process for the separation of hydrogen sulfide and methane which comprises cooling a stream of methane containing more than 6 mole percent hydrogen sulfide while at a pressure above 450 pounds per square inch absolute to a temperature sufficiently low at the pressure employed to produce only two liquid phases, one of said liquid phases being rich in methane and containing hydrogen sulfide in an amount less than in the feed stream and the other of said liquid phases containing hydrogen sulfide in an amount more than in the feed stream, and recovering the methane rich liquid phase as a product of the process.

12. A process for the separation of hydrogen sulfide and methane which comprises expanding liquid methane containing not more than 6 mole percent hydrogen sulfide to a temperature not higher than −258° F. to form vaporous methane and finely divided solid hydrogen sulfide, separating finely divided solid hydrogen sulfide from the expanded methane and recovering methane containing less hydrogen sulfide than the original feed stream.

13. A process for the separation of hydrogen sulfide and methane which comprises cooling a stream of methane containing more than 6 mole percent hydrogen sulfide while at a pressure of at least 450 pounds per square inch absolute to a temperature sufficiently low to form two liquid phases, one of said liquid phases being rich in methane and the other of said phases being rich in hydrogen sulfide, and recovering at least one of said liquid phases as a product of the process.

14. A process for the separation of hydrogen sulfide from a gaseous mixture of hydrogen sulfide and methane which comprises maintaining the mixture of hydrogen sulfide and methane at a pressure between about 450 and about 800 pounds per square inch absolute, cooling the gaseous mixture under the above pressure sufficient to cause the formation of two liquid phases, one of said phases being rich in hydrogen sulfide and another of said phases being rich in methane, and recovering at least one of said liquid phases as a product of the process.

15. A process for the separation of hydrogen sulfide from natural gas containing 6 to 90 volume percent hydrogen sulfide which comprises maintaining the natural gas at a pressure between about 450 and about 800 pounds per square inch absolute, cooling the natural gas under the above pressure to a temperature between about −132° F. and about −99° F. under three-phase equilibrium conditions to cause the formation of three phases, a vapor methane rich phase containing 3.5 to 6 mole percent hydrogen sulfide, a liquid methane rich phase containing 6.5 to 7.5 mole percent hydrogen sulfide, and a liquid hydrogen sulfide rich phase containing about 90 mole percent hydrogen sulfide, and recovering said methane rich phases as products of the process.

16. A process for the removing of hydrogen sulfide from a mixture of methane and hydrogen sulfide which comprises expanding liquid methane containing not more than 6 mole percent hydrogen sulfide to reduce the temperature to not higher than −258° F. to form vaporous methane and solid hydrogen sulfide, passing the resulting mixture of vaporous methane and finely divided solid hydrogen sulfide to a separation zone, separating solid hydrogen sulfide from vaporous methane in said separation zone and recovering methane containing less hydrogen sulfide as a product of the process.

17. A process for the separation of hydrogen sulfide and methane which comprises cooling a gaseous stream of methane containing more than 6 mole percent hydrogen sulfide while at a pressure of 600 pounds per square inch absolute to a temperature not higher than −117° F. to form two liquid phases, one of said liquid phases being rich in methane and containing about 7 mole percent hydrogen sulfide and the other of said phases containing about 90 mole percent hydrogen sulfide, and recovering said methane rich liquid phase as a product of the process.

18. A process for the separation of hydrogen sulfide and methane which comprises cooling a gaseous stream of methane containing more than 6 mole percent hydrogen sulfide while at a pressure of about 600 pounds per square inch absolute to a temperature of about −120° F. to produce only two liquid phases, one of said liquid phases being rich in methane and containing between about 6 mole percent hydrogen sulfide and the other of said liquid phases containing about 90 mole percent hydrogen sulfide, and recovering the methane rich liquid phase.

19. A process for the separation of hydrogen sulfide and methane which comprises continuously reducing the temperature of a stream of methane containing more than 6 mole percent hydrogen sulfide while at a pressure of at least 450 pounds per square inch absolute from a relatively high temperature to a relatively low temperature at which low temperature two liquid phases are formed, one of said liquid phases being rich in methane and the other of said phases being rich in hydrogen sulfide, separating said liquid phases and recovering at least one of said liquid phases as a product of the process.

20. A process for removing hydrogen sulfide from a mixture of methane and hydrogen sulfide containing not more than 6 mole percent hydrogen sulfide which comprises cooling a gaseous stream of methane containing not more than 6 mole percent hydrogen sulfide while at a pressure not lower than 485 pounds per square inch absolute and to a temperature above −132° F. but sufficiently low to form a liquid methane phase containing dissolved hydrogen sulfide therein substantially free from solid hydrogen sulfide, expanding said liquid methane phase containing dissolved hydrogen sulfide to about atmospheric pressure and to a temperature of about −258° F. to form vaporous methane and finely divided solid hydrogen sulfide suspended therein, passing the resulting vaporous methane stream containing finely divided solid hydrogen sulfide to a separation zone, separating finely divided solid hydrogen sulfide from vaporous methane in said separation zone, and recovering methane from said separation zone substantially free from hydrogen sulfide.

References Cited in the file of this patent

UNITED STATES PATENTS

| | | |
|---|---|---|
| 668,197 | LeSueur | Feb. 19, 1901 |
| 2,029,262 | Hansen | Jan. 28, 1936 |
| 2,070,098 | Twomey | Feb. 9, 1937 |
| 2,306,553 | Miller | Dec. 29, 1942 |
| 2,313,681 | Steedman | Mar. 9, 1943 |
| 2,650,154 | Anderson | Aug. 25, 1953 |
| 2,677,945 | Miller | May 11, 1954 |